United States Patent

[11] 3,624,603

[72] Inventor William E. Delcomyn
Melbourne, Fla.
[21] Appl. No. 869,991
[22] Filed Sept. 16, 1969
[45] Patented Nov. 30, 1971
[73] Assignee General Electric Company

[54] DIGITAL DATA COMMUNICATIONS SYSTEM WITH MEANS FOR IMPROVING SYSTEM SECURITY
10 Claims, 14 Drawing Figs.

[52] U.S. Cl. .......... 340/146.1, 340/147, 340/163
[51] Int. Cl. .......... G08c 25/00
[50] Field of Search .......... 340/146.1, 146.2, 147, 163; 235/153

[56] References Cited
UNITED STATES PATENTS
2,854,653 9/1958 Lunkin .......... 340/146.1 X
3,174,133 3/1965 Kunzman et al. .......... 340/146.1 X
3,427,585 2/1969 Milford .......... 340/146.1
3,449,717 6/1969 Smith et al. .......... 340/146.1

*Primary Examiner*—Malcolm A. Morrison
*Assistant Examiner*—Charles E. Atkinson
*Attorneys*—John B. Sponsler, Gerald R. Woods, J. C. Davis, Jr., Frank L. Neuhauser, Oscar B. Waddell, Melvin M. Goldenberg and Arnold E. Renner

ABSTRACT: For reducing the possibility that unsafe machine operation may result from distorted digital code words representing commands or conditions, a communications system in which both the machine and a central control unit include transceivers which repetitively transmit a digital word sequence consisting of a digital word and its complement. Decoder logic in the other transceiver must recognize both an acceptable digital word and the complement of that word before machine operations will be ordered or initiated.

INVENTOR.
WILLIAM E. DELCOMYN

BY
Harold R. Woods

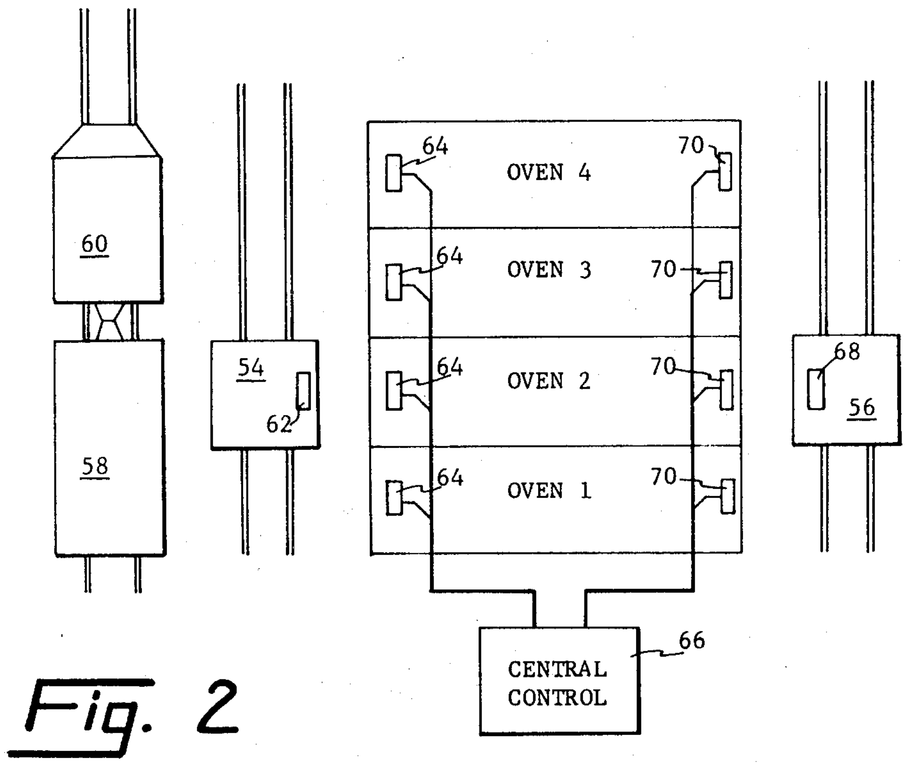
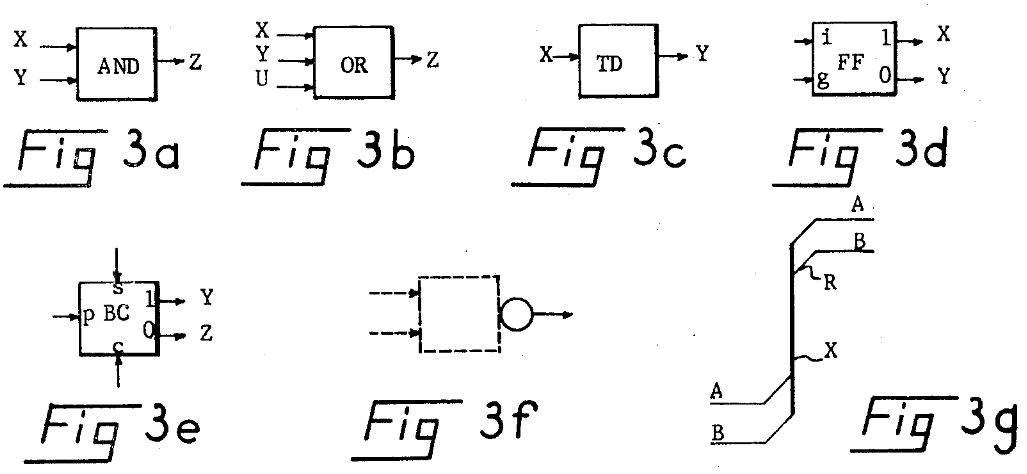
Fig 3a, Fig 3b, Fig 3c, Fig 3d, Fig 3e, Fig 3f, Fig 3g
Fig. 3
INVENTOR.
WILLIAM E. DELCOMYN
BY
Gerald R. Woods INVENTOR.
WILLIAM E. DELCOMYN
BY
Harold R. Woods

INVENTOR.
WILLIAM E. DELCOMYN

BY

Harold R. Woods

INVENTOR.
WILLIAM E. DELCOMYN
BY
Gerald R. Woods

INVENTOR.
WILLIAM E. DELCOMYN
BY
Gerald R. Woods

DIGITAL DATA COMMUNICATIONS SYSTEM WITH MEANS FOR IMPROVING SYSTEM SECURITY

BACKGROUND OF THE INVENTION

The present invention relates to communications systems and more particularly to a secure digital data communications system which reduces the possibility that unsafe operations may result from distorted signals.

In many industries, the term "communications systems" includes not only voice communications systems but digital data communications systems used in controlling the operation of machinery. To reduce the possibility of unsafe machine operations, it is extremely important that a digital data communications system be secure. A secure digital data communications system is one which accepts and responds to only those transmitted signals which are free of the distortive effects of channel or electrical noise or component failure. If a digital data communications system is not secure it may accept and respond to distorted signals causing premature or delayed positioning of materials, vehicles, or machines with possible consequent injuries to personnel, damage to machines or vehicles, or loss of materials.

For example, in the coke-producing industry, a communications system may be used in regulating the "pushing" or removal of heated coke from an oven. The movements of a coke pushing machine used to push the coke from the oven and of a coke-carrying hot car used to receive the heated coke would be controlled by a communications system. If the coke-carrying hot car is falsely indicated to be ready to receive coke due to signal distortion in the communications system, coke prematurely pushed from the oven may engulf the hot car to the obvious great danger of personnel in the area. To reduce the possibility that such a mishap might be caused by signal distortion due to channel or electrical noise or component failure, a highly secure communications system was developed. Although the system is particularly useful in industries such as the coke-producing industry, it may be used wherever system security is important.

SUMMARY OF THE INVENTION

The present invention is a digital data communications system having means for reducing the possibility that unsafe operations may result from the distortion of digital code words during the transmission of those code words from one location to another. The system includes a transceiver at each of the two locations. Each transceiver includes a transmitter section for transmitting a digital code word and a predetermined permutation of the same code word in sequence. Each transceiver also includes a receiver section having a decoding means and an output means which is partially enabled when one form of an acceptable digital code word is recognized by the decoding means and is fully enabled when the permutated form of the same code word is recognized by the decoding means.

DESCRIPTION OF THE DRAWINGS

While the specifications concludes with claims particularly pointing out and distinctly claiming that which is regarded as the present invention, the details of a preferred embodiment of the invention along with its further objects and advantages may be more readily ascertained from the following detailed description when read in conjunction with the accompanying drawings in which:

FIG. 2 is a schematic diagram of a coke battery representing an industrial application for a communications system implemented in accordance with the present invention;

FIG. 3, consisting of FIGS. 3*a* through 3*g*, is a glossary of the various logic symbols and drafting conventions used in the detailed description;

DETAILED DESCRIPTION

Figure 1:
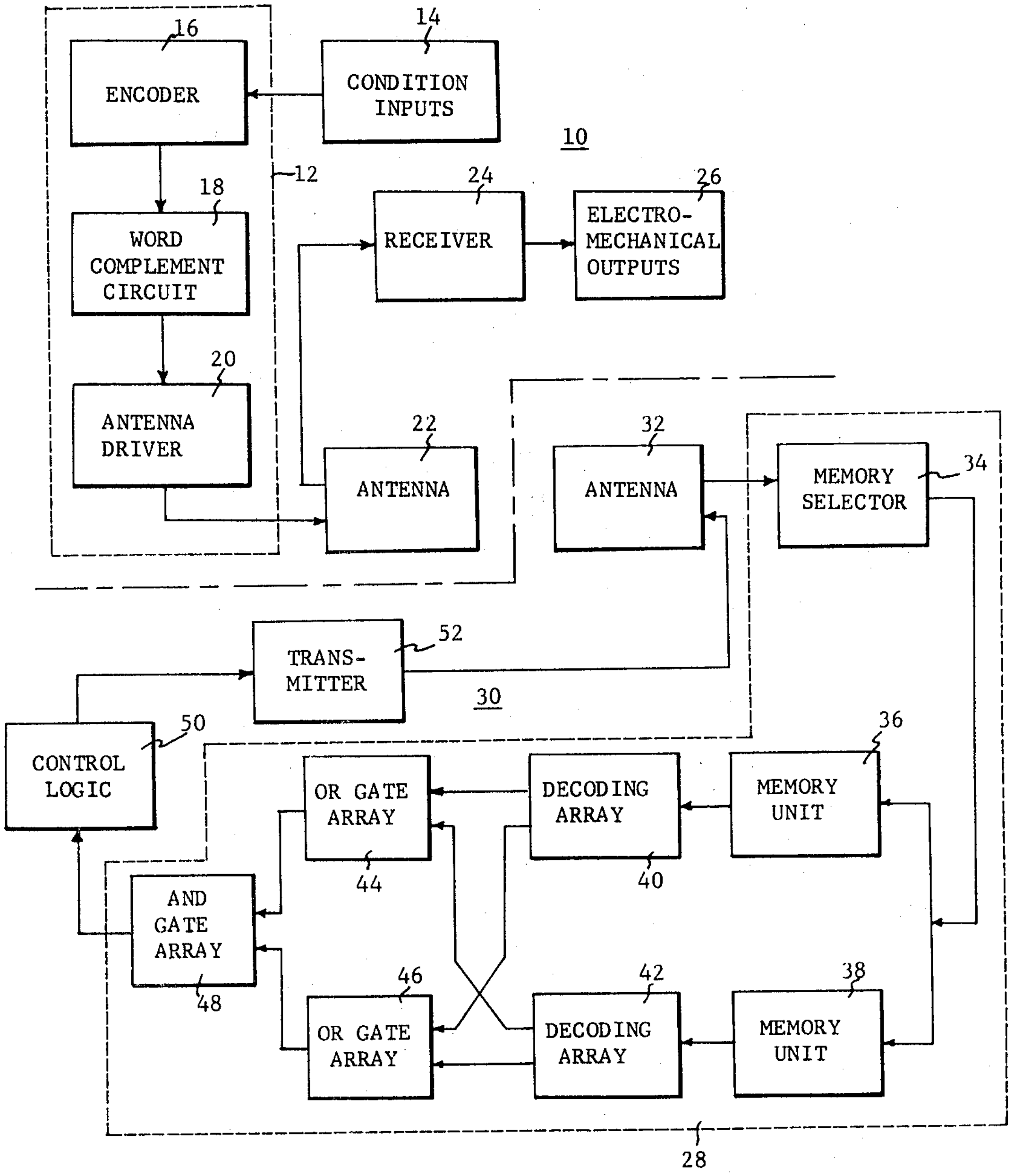
FIG. 1 is a block diagram showing a communications system implemented in accordance with the present invention.

FIG. 1 is a block diagram of a pair of transceivers used in a digital data communications system for controlling the operation of a machine by a remote central control unit. To facilitate the description of the transceivers, the transmitter and receiver sections of each transceiver are shown and described as if they are completely separate. In practice, the transmitter and receiver sections of a transceiver make use of common circuits at different times in an operating cycle.

A machine-mounted transceiver 10 includes a transmitter section 12 which accepts one or more condition-indicating inputs from sources such as position sensors or operator-controlled pushbuttons. The individual inputs, referred to collectively as condition inputs 14, may be applied to an encoder 16 which transforms them into multiple bit binary or digital code words, each of which indicates the existence of a particular condition. Digital code words are applied to a word complementing circuit 18 which permutates every other digital code word in a predetermined manner before applying the word forms to an antenna driver 20. Word forms, whether true or permutated, are conditioned by antenna driver 20 for transmission to a central control unit transceiver through a machine-mounted antenna 22.

Transmitter section 12 operates repetitively to supply a word form, alternately true and permutated, to the antenna 22 so long as an indicated condition exists at the input to the transmitter section 12. More particularly, during one part of an operating cycle, a digital code word formed in encoder 16 is supplied in true form to the antenna driver 20 without being altered by the word complementing circuit 18. During a succeeding part of the same cycle, the word complementing circuit 18 permutates the digital code word by complementing each bit in the digital code word. The complemented form is then supplied to the antenna driver 20. For example, if the binary word 0111 (decimal value of 7) is provided at the output from the word complementing circuit 18 during a first part of an operating cycle, the complemented form 1000 (decimal value of 8) of that word is supplied to antenna driver 20 by the word complementing circuit 18 during the next part of the same operating cycle.

The machine-mounted transceiver 10 also includes a receiver section 24 which receives and decodes word forms transmitted from a central control unit transceiver 30. The decoded words actuate electromechanical outputs 26 used to control the movement or positioning of the machine. The receiver section 24 in the machine-mounted transceiver 10 has the same logical construction as a below-described receiver section 28 in the central control unit transceiver 30.

The central control unit transceiver 30 is connected to an antenna 32 which detects word forms transmitted from other transceivers and transmits word forms back to those transceivers. Word forms detected by antenna 22 are routed to a memory selector 34 which directs alternately received forms to one or the other of a pair of memory units 36 and 38. Memory units 36 and 38 are connected to decoding arrays 40 and 42 which determine whether the connected memory unit contains the true or the complemented form of an acceptable word. If either of the memory units 36 and 38 contains the true form of an acceptable word, an output signal is generated which is applied to a particular OR gate in an OR gate array 44. Similarly, if either of the memory units 36 and 38 contains the complemented form of an acceptable word, an output signal is applied to a particular OR gate in a second OR gate array 46.

When an OR gate in the in array 44 is enabled in response to the detected presence of the true form of an acceptable word in either of the memory units 36 and 38, a particular AND gate in AND-gate array 48 is partially enabled. When an OR gate in OR gate array 46 is enabled due to the detected presence of the complemented form of the same word in the other of the memory units 36 and 38, the same AND gate in AND-gate array 48 is fully enabled. The outputs from the AND-gate array 48 are supplied to control logic 50, which on the basis of the decoded signal and other input information, provides a logical decision as to the appropriate movements which may be taken by the machine. The decision, in digital code word form, is supplied to a transmitter section 52, which like the transmitter section 12 of the machine-mounted transceiver 10, contains a word complemented circuit and an antenna. Alternately complemented word forms generated by transmitter section 52 are detected by receiver section 24 of the machine-mounted transceiver 10 and are decoded to determine which of the electromechanical outputs 26 is to be actuated.

In a preferred embodiment of the invention, each of the arrays 40 and 42 has the capacity to determine whether the memory unit to which it is connected contains either the true or the complemented form of a word. Having this capacity in the decoding arrays makes it possible to have alternately received word forms steered into different memory units, thereby avoiding any requirement that the true form (or the complemented form) be steered to a particular memory unit.

The communications system described above reduces the possibility that unsafe operations may result from the distortion of a digital code word during transmission. No signal received by a transceiver is applied to control logic or electromechanical outputs until the signals at the outputs of OR gate arrays in the transceiver indicate that the true and complemented forms of an acceptable digital code word are currently stored in opposite memory units. It is possible that channel or electrical noise may distort a single word form in such a way that the decoding arrays will recognize one form of an acceptable digital code word different from the word which should have been recognized. In such a case, a particular AND gate in the AND-gate array is partially enabled. However, since the opposite form of the same digital code word is transmitted at a different time during the same operating cycle, the same word bit that was distorted in one way during one part of the cycle must be distorted in the opposite way during the different part of the cycle in order for the decoding arrays to recognize opposite forms of the same erroneous digital code word. Since it is highly unlikely, considering the random and sporadic nature of noise, that the same bit in opposite forms of the same word will be distorted in opposite ways as the word forms are transmitted at different times, it is also unlikely that any of the AND gates in the AND-gate array will be fully enabled. As long as the distortion continues, there is little possibility that enabling signals will be supplied to the control logic in the central control unit or to the electromechanical outputs on the machine.

It is also possible that components of the transceivers may fail at any time, thereby resulting in the distortion of any digital code words transmitted or received. Since each of the elements in the transmitter section of a transceiver must change states in order to generate and transmit the true and complemented forms of an acceptable digital code word without distortion, the failure of a component in either an open circuit or a short circuit state necessarily results in the distortion of one of the two word forms. Since the receiver portion must see opposite forms of the same digital code word, no enabling signals will be supplied to control logic or electromechanical outputs under these conditions.

Physical Environment

The logical construction and operation of a digital data communications system of the type shown in block diagram form in FIG. 1 is best explained with reference to an industrial application of such a system. FIG. 2 is a simplified drawing of a typical coke battery in which coke is formed by heating coal in individual coke ovens for a period of 12 to 17 hours. After the coal in a selected oven has been heated for the desired time, a door machine 54 is maneuvered into position at the left side of the selected coke oven and a pusher machine 56 is maneuvered into position at the right side of the same oven. When both the door machine 54 and the pusher machine 56 are in place, doors at each end of the oven are removed. The coke is pushed from the oven by a pusher machine ram, across a coke guide on the door machine 54, and into a hot car 58 pulled by locomotive 60. The loaded hot car moves to a water tower where the coke is quenched before being dumped on a storage wharf.

In this coke battery, a digital data communications system implemented in accordance with the present invention may be used to prevent the premature pushing or unloading of a coke oven. The door machine 54 includes a transceiver connected to a machine-mounted antenna 62. Similar antennas 64 are mounted at the left ends of the coke ovens and are connected to a transceiver in a central control unit 66. The central control unit is also coupled to a transceiver mounted on the pusher machine 56 through antennas 70 mounted at the right ends of the coke ovens and an antenna 68 mounted on pusher machine 56.

Typical code words which would be transmitted or received by transceivers in a coke battery communications system implemented in accordance with the present invention are listed below.

| Transceiver | Function | Condition indicated | Coding |
|---|---|---|---|
| Pusher machine | Transmit | 1. Pusher in long travel | 0001 |
| | | 2. Coke being pushed | 0011 |
| | | 3. End of push stroke | 0010 |
| | Receive | 4. Begin pushing | 0100 |
| Door machine | Transmit | 5. OK to push | 0111 |
| | | 6. Emergency stop | 0101 |
| Central control unit | Receive | Signals 1–3, 5, 6 | |
| | Transmit | 7. Begin pushing plus signals to hot car | 0100 |

As may be seen from the above table, a pusher machine transceiver would be capable of transmitting three different condition-indicating words. The first of these words, Pusher in Long Travel, indicates that the pusher machine ram is moving toward the coke contained in the selected coke oven but has not yet compressed the coke sufficiently to cause it to fall into the hot car 58. The second word, Coke Being Pushed, indicates that the coke is in the process of being pushed from the selected coke oven into the hot car 58. The third word, End of Push Stroke, indicates that the pusher machine ram is at the end of its push stroke. Each of these conditions may be sensed by conventional electrical or mechanical sensors. The receiver section of the pusher machine transceiver is capable of detecting a single digital code word, Begin Pushing, which indicates that the coke pushing process may be safely started.

The door machine transceiver should be capable of transmitting two condition-indicating words. First of these words, OK to Push, indicates that the pusher machine 56 may commence pushing the coke from the selected coke oven. Normally, this word may be generated only if two conditions are satisfied. First, the door machine 54 must be in position at the left end of a selected coke oven. Second, the doors must be removed from the selected coke oven. Suitable mechanical or electrical interlocks may be used to assure that these conditions are met before the OK to Push signal can be transmitted. The second of the words, Emergency Stop, is transmitted when an operator-controlled switch is thrown. This word is an emergency signal which results in an immediate cessation of all pushing operations.

Symbols and Nomenclature

Details of the logical construction of transceivers used in a digital data communications system implemented in accordance with the present invention are described below. To facilitate that description, a glossary of the more common logic elements and drafting conventions to be used appears in FIG. 3. In the following descriptions, the term "logic ONE" is used to refer to a signal having a predetermined voltage (usually +5 volts) whereas the term "logic ZERO" refers to a zero voltage. Inputs are usually located at the left side or at the top of a logic element whereas outputs are usually located at the right side of an element. An input located at the bottom of an element is generally a clear or reset input. The application of a logic ONE to this input causes the logic element to assume a reset state. An input at the top of an element may be a set input. When a logic ONE is applied to a set input, the logic element assumes a set state. The meaning of the terms "reset" state and "set" state with respect to the condition of each element is made clear in the description of that element.

AND GATE

FIG. 3*a* shows an AND gate having at least a pair of inputs X and Y and an output Z. If logic ONE signals are applied at all of the inputs simultaneously, a logic ONE appears at the output. In this state, the AND gate is said to be fully enabled. IF a logic ZERO is applied at any of the inputs, a logic ZERO appears at the output. In this state, the AND gate is said to be inhibited.

OR GATE

FIG. 3*b* shows an OR gate having inputs X,Y and U and output Z. If a logic ONE is applied at any of the inputs, a logic ONE appears at the output. If ZERO signals are applied at all of the inputs, a logic ZERO appears at the output.

TIME DELAY

FIG. 3*c* shows a time delay element having an input X and an output Y. When a logic ONE is applied at the input X, a logic ONE appears at the output after a time delay of predetermined length. If, however, a second logic ONE is applied at input X during the delay period, the output Y immediately returns to a logic ZERO.

FLIP-FLOP

FIG. 3*d* shows a gated flip flop which includes a data input *i* , a data gate *g*, a normal output X, and an inverse output Y. If a logic ONE exists at the data gate, the flip-flop assumes a set state when a logic ONE appears on the data input and a reset state when a logic ZERO appears on the data input. In its set state, the normal output is a logic ONE and the inverse output is a logic ZERO. In the reset state, the normal output is a logic ZERO and the inverse output is a logic ONE. IF a logic ZERO is applied to the data gate, signals appearing at the data input do not alter the existing state of the flip-flop.

BINARY COUNTER ELEMENT

FIG. 3*e* shows a binary counter element having a pulse input P, a clear input C, a set input S, a normal output Y, and an inverse output Z. If a logic ONE is applied at the pulse input while the clear and set inputs are held at logic ZERO, the signals on the outputs change to the levels opposite the prepulse levels. The binary counter element then remains in that state until a logic ONE is applied to the clear or set input or until another logic ONE is applied to the pulse input. A logic ONE at the clear input results in a logic ZERO at the normal output and a logic ONE at the inverse output. A logic ONE at the set input results in a logic ONE at the normal output and a logic ZERO at the inverse output.

INVERTER

FIG. 3*f* shows an inverter symbol, a small circle located at the inputs or outputs of other types of logic elements. The inverter changes the state of any signal applied to it. For instance, when a logic ONE is applied at the left side of the inverter shown in FIG. 3*f*, logic ZERO appears at the right side. Conversely, when a logic ZERO is applied at the left side of the inverter, a logic ONE appears at the right side.

TRUNKLINE

FIG. 3*g* shows a trunkline, a drafting convention used to eliminate excessive numbers of parallel wires in drawings. Three individual wires A, B, and C are shown entering a trunkline X (recognizable by its thicker line) at its upper end and leaving the trunkline at its lower end. Where the trunkline symbol is used, each wire is identified at some point before it enters the trunkline and at some point after it leaves the trunkline. Trunkline connections can be distinguished from conventional wiring connections or crossovers by the slanted junctions R between the individual wires and the trunkline.

Transmitter Section Logic Circuits

Figure 4:
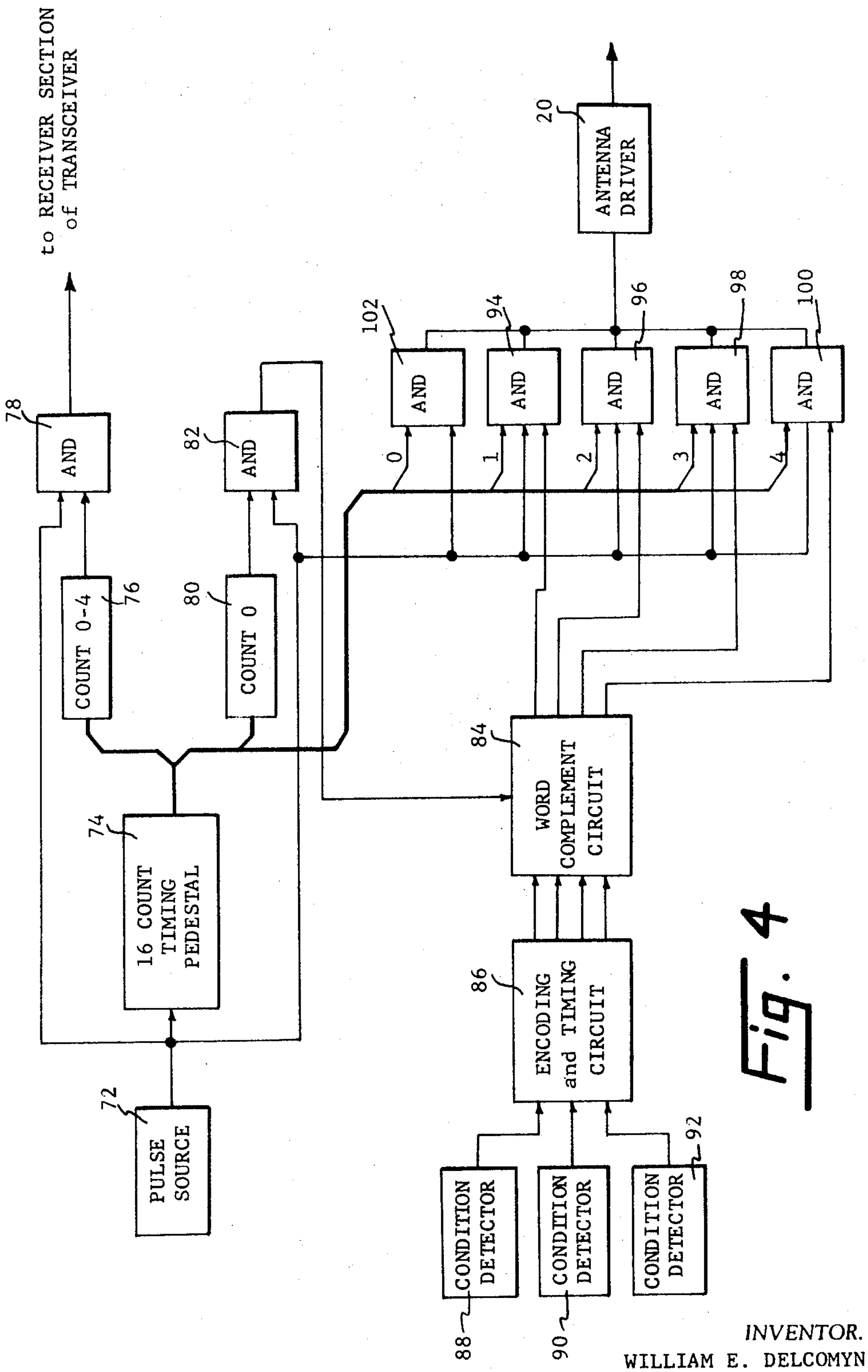
FIG. 4 is a detailed block diagram of the transmitter section of a transceiver implemented in accordance with the present invention.

FIG. 4 is a block diagram of the logical construction of the transmitter section of a transceiver implemented in accordance with the present invention. A. pulse source 72 supplies 250 pulses per second to a 16 count timing pedestal circuit 74 of the type that counts from zero through 15 repetitively. Each 16 count sequence of the timing pedestal circuit 74, which may be a simple 4 bit binary counting chain, may be considered to be one half of a complete operating cycle. During the first 5 counts ((0-4) of each 16 count sequence, the receiver section of the transceiver is disabled by a blanking circuit including a count gate 76 which outputs a continuous logic ONE during the first five counts. The continuous logic ONE output of the count gate 76 is combined in an AND-gate 78 with an output from the pulse source 72 to produce blanking pulses during the first 5 counts.

The timing pedestal circuit 74 is also connected to a count gate 80 which outputs a logic ONE at the count of zero in the timing pedestal circuit 74. The output of the count gate 80 is one input to an AND-gate 82 is applied to a word complementing circuit 84 to cause a digital code word contained in the word complementing circuit 84 to be completely complemented at the beginning of each 16 count sequence. The digital code words contained in the word complementing circuit 84 are formed in an encoding and timing circuit 86 having inputs from a number of condition detectors 88, 90, and 92. The condition detectors 88, 90, and 92 may be of various types. They may be operator-controlled pushbuttons or electrical or mechanical sensors which produce an output signal representative of a certain condition of the machine. If the condition detectors 88, 90 and 92 provide analog signals, encoding and timing circuit 86 converts these analog signals to digital code words. One function of the encoding and timing circuit 86 is to time the connection of the condition detectors 88, 90, 92 to the word complementary circuit 84 so that only one detector at a time is connected to circuit 84. Naturally, if the condition detectors 88, 90, and 92 have digital code word outputs, this would be the only function of encoding and timing circuit 86.

The word complementing circuit 84 has four output channels, each of which carries one bit of a four bit digital code word. Each output channel is connected to one input The one of a number of AND-gates 94, 96, 98, and 100. These AND gates permit the digital code word to be transmitted one bit at a time as is explained below. The pulse source 72 is connected to another input to each of these AND gates and to an additional AND-gate 102. A second input to the AND-gate 102 2, 3, a third input to the AND-gates 94, 96, 98 and 100 is supplied by the timing pedestal circuit 74. The AND-gate 102 supplies a key or synchronizing logic ONE pulse at the beginning (zero count) of each 16 count sequence. This pulse is used to condition the receiver section of the receiving transceiver. The details of the conditioning are set out in the description of the logical construction of the transceiver. The AND-gate 94 is partially enabled by a pulse from pulse source 72 when a count of one exists in timing pedestal circuit 74. If the word complementing circuit is supplying a logic ONE to AND-gate 94 at this time, a logic ONE is supplied to antenna driver 20. The AND-gates 96, 98, and 100 are similarly enabled at counts 2, 3, and 4 in the timing pedestal circuit 74 provided a logic ONE exists at their respective inputs from the word complementing circuit 84.

Receiver Section Logic Circuits

Figure 5:
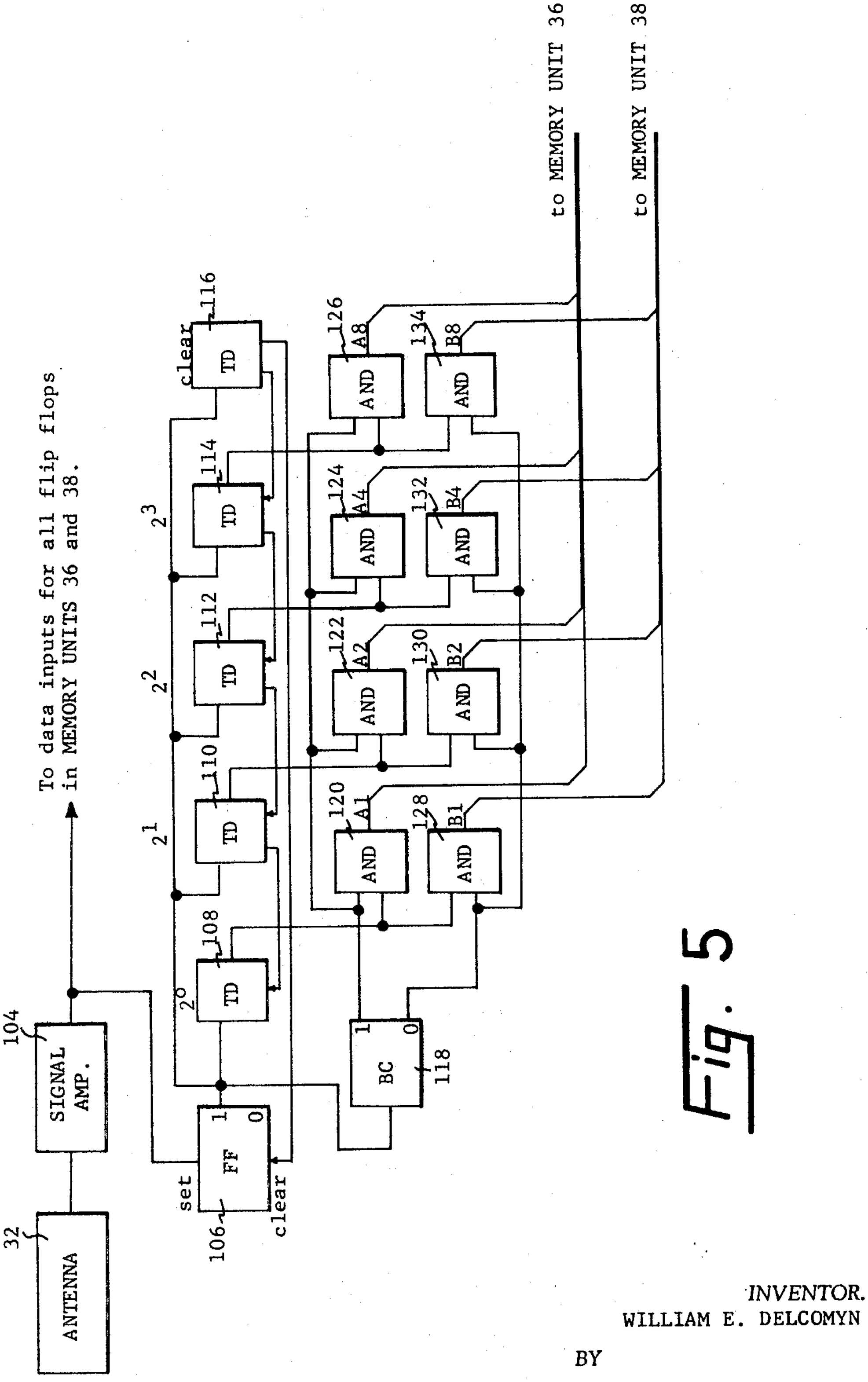
FIG. 5 is a detailed block diagram of one part of a receiver section of a transceiver implemented in accordance with the present invention.

Referring to FIG. 5, each serially transmitted word form is detected by an antenna 32 connected to a transceiver 30 and is amplified by a conventional signal amplifier 104. At the beginning of each 16 count operating sequence, the synchronizing logic ONE pulse sets a flip flop 106. After the flip-flop 106 is set by the synchronizing pulse, succeeding pulses from the signal amplifier 104 have no effect. The logic ONE appearing on the normal output of flip-flop 106 is applied to the pulse input of a binary counter element 118 to drive the element 118 into its opposite state. When the binary counter element 118 is in its set state, the logic ONE on its normal output is applied to one input of a plurality of AND-gates 120, 122, 124, and 126. When the binary counter element 118 is in its reset state, the logic ONE on its inverse output is applied to one input for a second plurality of AND-gates 128, 130, 132, and 134.

Also, when the flip-flop 106 is set by the synchronizing pulse a logic ONE signal is applied to time delay elements 108, 110, 112, 114, and 116 forming a timing chain. Before the first bit of the serially transmitted word form is to be received, the output of the time delay 108 goes to logic ONE and remains there until the time for receiving the first bit is past. While the output of the time delay circuit 108 is at a logic ONE level, either AND-gate 120 or AND-gate 128 is enabled depending upon the state of the binary counter element 118. After the first bit should have been received but the second bit is to arrive, time delay 110 resets the time delay 108 and also supplies a logic ONE for a period of time sufficient to allow the reception of the second bit. During this time either AND-gate 122 or 130 is enabled, again depending upon the condition of the binary element 118. The time delay 112 is reset by the time delay 114 when the latter element outputs a logic ONE for the reception of the third bit of the digital code word. Similarly, time delay 112 is reset by the time delay 114 when that circuit outputs a logic ONE just before the fourth bit of the word form is to be received. After a period of time sufficient to assure the reception of the fourth bit of the word form, the output of a clearing time delay 116 goes to a logic ONE level to reset both time delay 114 and the flip-flop 106.

Figure 7:
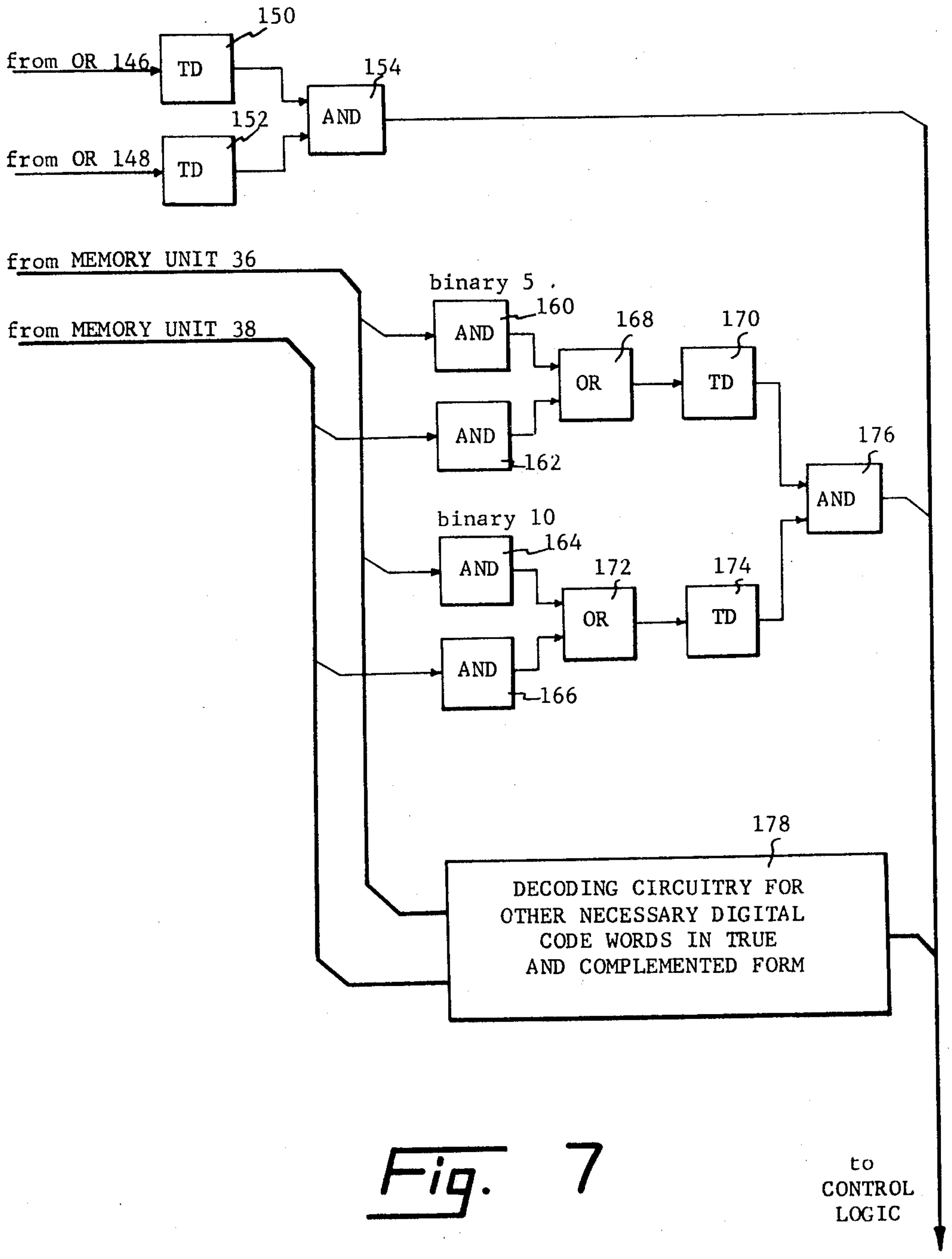
FIG. 7 is a less detailed block diagram of the remaining part of the receiver section.

The outputs of AND-gates 120, 122, 124, and 126 are applied to the data gates of flip-flops A1, A2, A4, and A8 in memory unit 36 shown in FIG. 7. Similarly, AND-gates 128, 130, 132, and 134 are connected to data gates of flip-flops B1, B2, B4, and B8 of the memory unit 38. The data input terminal for each of the flip-flops in the memory units 36 and 38 is connected to the output of the signal amplifier 104. If a logic ONE is generated by the signal amplifier 104 while a logic ONE exists at the data gate for a particular flip-flop, the flip-flop is driven into its set state wherein a logic ONE appears on it normal output and logic ZERO appears on its inverse output. Because the timing circuit described with reference to FIG. 5 assures that the flip-flop in one of the memory units will be energized in sequence during the time the bits in a word form are to be received, the net result is that during each 16 count operating sequence, a complete word form is set into one of the memory units. During the next 16 count sequence, a different word form is set into the other one of the memory units. The two successive 16 count sequences constitute a complete operating cycle in the transceiver.

Figure 6:
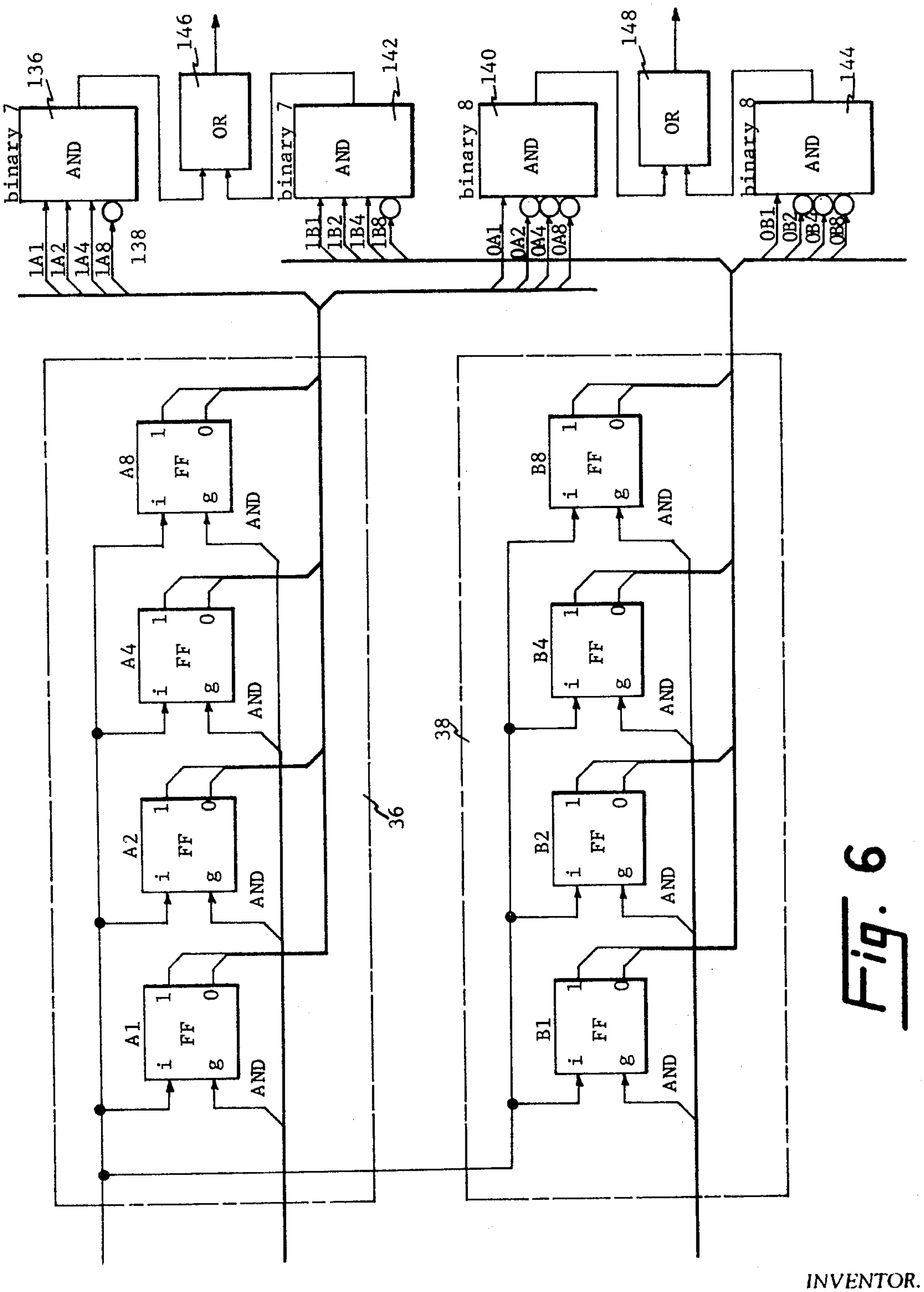
FIG. 6 is a detailed block diagram of another part of the receiver section.

To illustrate the operation of the circuits described with reference to FIGS. 5 and 6, assume that the binary counter element 118 is driven into its set state by a synchronizing pulse at the beginning of a 16 count sequence and that a binary 7 (0111) is being serially transmitted to the transceiver during this particular 16 count sequence. Although each bit of this word form is applied to the data input for each of the flip-flops in both memory units 36 and 38, none of the flip-flops in the memory unit 38 can respond since each is inhibited by a logic ZERO on its data gate supplied by AND-gates 128, 130, 132, and 134. In memory unit 36, the data gate for the flip-flop A1 carries a logic ONE as the first bit is applied to the data input. Since the first or least significant bit of a binary 7 is a logic ONE, the flip-flop A1 is driven into its set state. As the second bit is being received, the data gate for the flip-flop A2 carries a logic ONE. Consequently the flip-flop A2 is set by the logic ONE. The flip-flop A4 is set by the third bit in a similar manner. Since the fourth bit of the binary equivalent of a decimal 7 is a logic ZERO, the flip-flop element A8 remains in its reset state. The remainder of the 16 count operating sequence may be utilized by the control logic in the central control unit and by the transmission of a responsive word form through the transmitter section of the central control unit transceiver.

AT the beginning of the next 16 count sequence, a synchronizing pulse is again applied to the set input for the flip-flop 106. The subsequent logic ONE on the normal output of flip-flop element 106 drives the binary counter element 118 from its existing set state to its reset state. At the same time, the binary 7 existing in the word complementing circuit of the sending transceiver is complemented to form a binary 8 (1000). Because the binary counter element 118 is in its reset state, AND-gates 128, 130, 132, and 134 will sequentially apply logic ONES to the data gates for flip-flops B1, B2, B4, and B8 in memory unit 38. HOwever, because the three most insignificant bits in the binary equivalent of a decimal 8 are logic ZEROS, flip-flops B1, B2, and B4 will remain in their reset state. The most significant bit in the binary equivalent of a decimal 8 is a logic ONE which, when applied to the data input for flip-flop B4, causes that flip-flop to be set.

To briefly summarize the foregoing, during a first 16 count sequence, a binary 7 (0111) is set into memory unit 36 with flip-flops A1, A2, and A4 being set and flip-flop A8 remaining reset. During the succeeding 16 count sequence, a binary 8 (1000) is set into memory unit 38 with flip-flops B1, B2, and B4 remaining reset and flip-flop B8 being set. These successive 16 count sequences form what has been referred to as a single operating cycle.

THe word forms stored in the memory units 36 and 38 are detected by decoding arrays 40 and 42. FIG. 6 shows the decoding logic elements needed for the purpose of recognizing the binary equivalent of a decimal 7 and a binary equivalent of its complement, a decimal 8. The normal or "1" outputs of the flip-flops A1, A2, and A4 in memory unit 36 are connected directly to the inputs to an AND-gate 136 while the normal output for flip-flop A8 is connected to the same AND gate through an input inverter 138. Whenever Flip-flops A1, A2 and A4 are in their set state and flip-flop A8 is in its reset state, AND-gate 136 will be fully enabled, providing a logic ONE at its output. The inverse or "0" outputs of the flip-flops in memory units 36 are connected to another AND-gate 140. Only the inverse output of flip-flop A1 is connected directly to AND-gate 140 with the inverse outputs of the remaining flip-flops being connected through input inverters. Whenever the inverse output of flip-flop A1 is a logic ZERO and the inverse outputs of the remaining flip-flops are logic ONES, the AND-gate 140 is fully enabled, thereby indicating the presence of a binary 8 in the memory unit.

The normal output of the flip-flops in memory unit 38 are connected to an AND-gate 142 in the same way flip-flops in memory unit 36 are connected to AND-gate 136. If a binary 7 is stored in memory unit 38, AND-gate 142 is fully enabled. Similarly, the flip-flops in memory unit 38 are connected in an AND-gate 144 to fully enable that AND gate whenever a binary 8, the complement of a binary 7, is stored in memory unit 38. If either of the memory units 36 or 38 contains a binary 7, one or the other of the inputs to an OR-gate 146 is a logic ONE which fully enables that OR gate. Similarly, if either of the memory units 36 or 38 contains a binary 8, one of the other of the inputs to OR-gate 148 is a logic ONE which fully enables that OR gate.

The outputs from OR-gates 146 and 148 are "stored" in a pair of time delay elements 150 and 152 shown in FIG. 7. These time delay elements serve to prevent changes in memory output due to updating of the memory contents during the decoding process. The outputs of the time delay elements 150 and 152 are combined in an output AND-gate 150 which produces a logic ONE only while the memory units 36 and 38 contain a binary 7 and its complement, a binary 8. The logic ONE appearing on the output of the AND-gate 154 may be utilized by control logic circuitry.

The decoding process is reviewed in less detail in connection with the detection of the presence of a binary 5 or its complement, a binary 10, in the memory units 36 and 38. IF memory unit 36 contains a binary 5, an AND-gate 160 is fully enabled and applies a logic ONE at one input to an OR-gate 168. If memory unit 38 contains the binary 5, an AND-gate 162 is fully enabled to apply logic ONE at another input to the OR-gate 168. The output of the OR-gate 168 is connected to a time delay element 170. IF memory unit 36 contains the complement of a binary 5, a binary 10, an AND-gate 164 is fully enabled whereas if memory unit 38 contains the complement, an AND-gate enabled an OR-gate 172 is fully enabled. If either of the AND-gates 164 or 166 is fully enabled, an OR-gate 172 produces a logic ONE at its output to a time delay element 174. IF time delay elements 170 and 174 are simultaneously enabled by logic ONES at their inputs, an output AND-gate 176 is fully enabled. The resulting logic ONE may be applied to control logic circuitry.

Since the decoding circuitry needed for recognizing all other digital code words is identical to that already described, additional circuitry is shown only as a single block 178. There has been no attempt to segregate the individual AND-gates and OR gates shown in FIGS. 5, 6, and 7 into the arrays 40, 42, 44, 46, and 48 discussed in connection with FIG. 1. It should be understood that decoding array 40 consists of all AND gates connected to memory unit 36 for detecting the presence of a digital code word in either true or complemented form. Similarly, decoding array 42 consists of all AND gates connected to memory unit 38 for detecting the presence of a digital code word in either true or complemented form. OR-gate array 44 is made up of all OR gates connected to those AND gates in arrays 40 and 42 used to detect the true form of digital code words while OR-gate array 46 is made up of all OR gates connected to those AND gates in arrays 40 and 42 used to detect complemented forms. Naturally, AND-gate array 48 consists of those AND gates connected to OR gates in arrays 44 and 46 which detect the opposite forms of the same digital code word.

To more clearly illustrate the operation of the digital data communications system described, the functioning of the system during the unloading of a coke oven is described. During the coke making process, the door machine 54 and the pusher machine 56 are maneuvered into position at opposite ends of the same coke oven. When the doors have been removed from the opposite ends of the coke oven, an operator depresses a pushbutton to transmit a signal indicating that the pushing may begin. A binary 7 is transmitted in alternation with its complement, a binary 8. If the binary 7 and the binary 8 are transmitted without distortion to the memory units 36 and 38 in a central control unit, AND-gate 154 at the output of the decoding circuitry will produce a logic ONE, thus indicating to the control logic that a valid "OK to Push" signal has been generated at the door machine 54. After this signal is accepted by the control logic along with other appropriate signals, the control logic may generate a "Begin Pushing" signal to be transmitted to the pusher machine 56. This signal is a binary 4 in alternation with its complement, a binary 11. If these digital code words are transmitted to a transceiver on the pusher machine 56 and are stored without being distorted during the transmission or reception, decoding circuits in the receiver section of the pusher machine transceiver supply a logic ONE to an operator display or to electromechanical outputs which control the operation of the pusher ram.

As the pusher ram begins to move through its stroke, the pusher machine transceiver transmits a binary 1 and its complement, a binary 14, to indicate that the ram is moving but has not yet pushed any coke from the coke oven. When the coke begins to spill into the hot car 58, the signal transmitted hy the pusher machine transceiver changes to a binary 3 in alternation with its complement, a binary 12. When this signal is received and decoded by the central control unit, it is used to control the movement of the locomotive 60. The locomotive 60 moves slowly at right angles to the coke guides on the door machine 54 so that coke falling from the coke guide into the hot car 58 is evenly distributed. When the pusher ram has reached its limit of movement in the coke oven, the pusher machine transceiver transmits a binary 2 in alternation with its complement, a binary 13. This signal is received and decoded by the central control unit and is used to control the acceleration of the locomotive away from the coke ovens to a nearby quenching tower while the door machine 54 and the pusher machine 56 are being maneuvered into positions at opposite ends of the next coke oven to be pushed. After the locomotive 60 and the hot car 58 are maneuvered back into their proper positions relative to the door machine, the above-described procedure is repeated at the next coke oven.

From the foregoing it is seen that digital data communications system implemented in accordance with the present invention reduces the possibility that unsafe machine operation may result from the transmission of a distorted digital code word. Since complementary forms of a digital code word are transmitted at the beginning of succeeding 16 count sequences. the time displacement between the completed transmission makes it quite unlikely that noise will distort corresponding complementary binary pulses in the complementary forms in a complementary fashion. Also, by requiring a change of state of each of the elements in the transmitter at the beginning of each 16 count sequence, a component failure has the effect of preventing the successful transmission and reception of acceptable digital code words since either the true form of a digital code word or the complemented form must be distorted by the failure.

What is claimed is:

1. For interconnecting a source of digital code words and a remote means for utilizing those words, a digital data communications system including:

a. a means connected to the source for cyclically transmitting different forms of one or more acceptable digital code words comprising;

1. timing means for repetitively generating counts in uniformly long count sequences to establish repetitive operating cycles made up of a predetermined number of sequences,
2. gating means connected to said timing means and responsive at a particular count in each sequence to provide an output signal, and
3. word permutating means connected to the source and to said gating means, said word permutating means being responsive to each of the output signals provided by said gating means to permutate the form of the word being provided by the source; and, b. means connected to the utilizing means for receiving the transmitted forms comprising;

1. decoding means for detecting each of the transmitted forms of the one or more acceptable words, and
2. gating means responsive to the concurrent detection of all of the different forms of the same word to apply a signal representing that word to the utilizing means.

2. A digital data communications system as recited in claim 1 wherein said word permutating means comprises means for complementing each bit of the existing word form in response to an output signal from said gating means.

3. For interconnecting a source of digital code words and a remote means for utilizing those words, a digital data communications system including:

a. means connected to the source for cyclically transmitting different forms of one or more acceptable digital code words;

b. means connected to the utilizing means for receiving the transmitted forms comprising;

1. decoding means for detecting each of the transmitted forms of the one or more acceptable words, and 2. gating means responsive to the concurrent detection of all of the different forms of the same word to apply a signal representing that word to the utilizing means;

c. a plurality of memory units for separately storing the different word forms transmitted by said transmitting means, d. means for steering successively received word forms to different units in said plurality; and, e. means for connecting each memory unit of said plurality to said decoding means.

4. For interconnecting a source of digital code words and a means for utilizing those words, a digital data communications system having a transceiver connected to the source and a similar transceiver connected to the utilizing means, each of said transceivers including:

a. a transmitting means for cyclically transmitting different forms of one or more acceptable digital code words; and b. a receiving means for receiving transmitted word forms comprising 1. a plurality of memory units for storing transmitted word forms, 2. decoding arrays connected to the memory units in said plurality for detecting the presence of the different forms of the one or more acceptable words, and 3. an AND-gate array connected to said decoding arrays, each of the AND gates in said array being inhibited when any one of the different forms of a particular word is detected by said decoding arrays and being fully enabled only when all of the different forms of a particular word are detected.

5. A digital data communications system as recited in claim 4 wherein said decoding arrays comprise identical arrays of AND gates connected to each one of said plurality of memory units, each of said AND gates being fully enabled only if the memory unit contains a particular form of a particular word.

6. A digital data communications system as recited in claim 5 wherein said receiving means further includes OR-gate arrays interconnecting the individual AND gates in said AND-gate array with the individual AND gates in said decoding arrays, each of said OR gates having inputs form all AND gates that detect a particular form of a particular word and an output to a single AND gate in said AND-gate array, whereby said single AND gate will be fully enabled regardless which of said plurality of memory units contains the particular form of a particular word.

7. A digital data communications system as recited in claim 4 wherein said transmitting means includes:

a. timing means for repetitively generating counts in uniformly long count sequences to establish repetitive operating cycles made up of a predetermined number of sequences;

b. gating means connected to said timing means and responsive at a particular count in each sequence to provide an output signal; and c. word permutating means connected to the source and to said gating means, said word permutating means being responsive to each of the output signals provided by said gating means to permutate the form of the word then being provided by the source.

8. A digital data communications system as recited in claim 7 wherein said word permutating means comprises means for complementing each bit of the existing word form in response to an output signal from said gating means.

9. A digital data communications system as recited in claim 7 wherein said decoding arrays comprise identical arrays of AND gates connected to each one of said plurality of memory units, each of said AND gates being fully enabled only if the memory unit contains a particular form of a particular word.

10. A digital data communications system as recited in claim 9 wherein said receiving means further OR-gate arrays interconnecting the individual AND gates in said AND-gate array with the individual AND gates in said decoding arrays, each of said OR gates having inputs from all AND gates that detect a particular form of a particular word and an output to a single AND-gate in said AND-gate array, whereby said single AND gate will be fully enabled regardless which of said plurality of memory units contains the particular form of a particular word.

* * * * *